United States Patent [19]

Hiller

[11] 3,722,891

[45] Mar. 27, 1973

[54] SOUND REPRODUCING DEVICE FOR TOYS

[76] Inventor: Waldemar Hiller, Maastricher Strasse 26, Cologne, Germany

[22] Filed: Nov. 10, 1971

[21] Appl. No.: 197,263

Related U.S. Application Data

[63] Continuation-in-part of Ser. No. 862,361, Sept. 30, 1969, abandoned.

[30] Foreign Application Priority Data

Oct. 19, 1968 Germany....................P 18 04 041.0

[52] U.S. Cl..........................274/22, 274/1 A, 274/7, 274/17, 274/44

[51] Int. Cl............................G11b 25/02, G11b 3/00

[58] Field of Search..........274/1 A, 1 C, 7, 8, 17, 41, 274/42 R, 43, 44, 19, 20, 21, 22

[56] References Cited

UNITED STATES PATENTS

| | | | |
|---|---|---|---|
| 1,303,074 | 5/1919 | Leake | 274/42 R |
| 3,477,728 | 11/1969 | Lindsay et al. | 274/1 A |

*Primary Examiner*—Robert B. Hull
*Assistant Examiner*—Steven L. Stephan
*Attorney*—H. Dale Palmatier

[57] ABSTRACT

A sound reproducing device for toys and the like comprising a drum as a carrier for the sound grooves, the drum being reciprocably journaled. The sound grooves extend helically over the drum circumference. The groove system consists of two interposed tracks connected at their terminations by means of guidings for the stylus of the pickup means, enabling the stylus to permanently engage any one of the grooves and thus eliminating the necessity to disengage the stylus for return to the respective groove start point of a groove.

4 Claims, 8 Drawing Figures

SOUND REPRODUCING DEVICE FOR TOYS

This application is a continuation-in-part of my copending application Ser. No. 862,361, filed Sept. 30, 1969, now abandoned.

SUMMARY OF INVENTION

The present invention relates to sound reproducing devices for toys and the like, as dolls, money boxes, animals, but it is as well applicable to propaganda and publicity means.

Such sound reproducing devices commonly comprise a sound track carrier, as a tape, a drum, a disc or the like to be moved in engagement with a pickup means. The pickup means in general consists of a stylus vibrated by the sound track and a diaphragm to radiate the sound.

The sound tracks very often are grooves quite similar to phonograph record disc grooves, and, as in the latter, at the end of the sound reproduction, the stylus must be disengaged from the groove and guided back to the groove's start point. This requires complex mechanism which is particularly troublesome in small and inexpensive devices with which the invention is concerned.

It is the object of the present invention to provide a sound reproducing device for toys and the like in which on a relatively small sound track carrier a relatively long sound track may be provided.

It is a further object of the present invention to provide a sound reproducing device in which the necessity of disengaging the pickup means from the sound track is completely eliminated, enabling manufacture of an extremely simple and inexpensive device.

It is a still further object of the present invention to provide means for inexpensive manufacture of such sound tracks.

In accordance with the invention, the sound track carrier is a drum rotatably journaled in a frame. The drum may be manually rotated in one direction whereby a spring is biased to return the drum into its start position. The drum carries on its circumference a multiplicity of sound tracks, as grooves or a tape wound onto the drum which is provided with said grooves, and a pickup means is provided at the frame, the pickup stylus being in engagement with the grooves. Upon manually rotating the drum, the stylus will be guided along the grooves which are helically disposed on the drum circumference so that it passes along the drum from about one end face to the other.

In order to eliminate the stylus disengagement at the groove end, the grooves are designed as twin screw thread windings so that each other groove will cooperate with the pickup means to reproduce its recorded sound when the drum is rotated in one direction while upon rotation of the drum in the reverse direction the pickup means cooperate with the intermediate or antiparallel grooves disposed in the interstices of the first set of grooves. The two terminations — one of each groove line helically extending over the drum and staggered with respect to each other — are interconnected by, for example, a guiding or reversal loop in which the stylus may slide to change from one groove to the other at the end of the drum forward turn so as to come in a position for cooperation with the next groove when the drum returns.

It will be noted that with the design of the invention the stylus may permanently remain in engagement with the grooves and need not be lifted for purpose of return while simultaneously both grooves may be used to record sound.

Further objects, features, and advantages of the invention will be explained in detail hereinunder with reference to the accompanying drawings which show:

Figure 1:
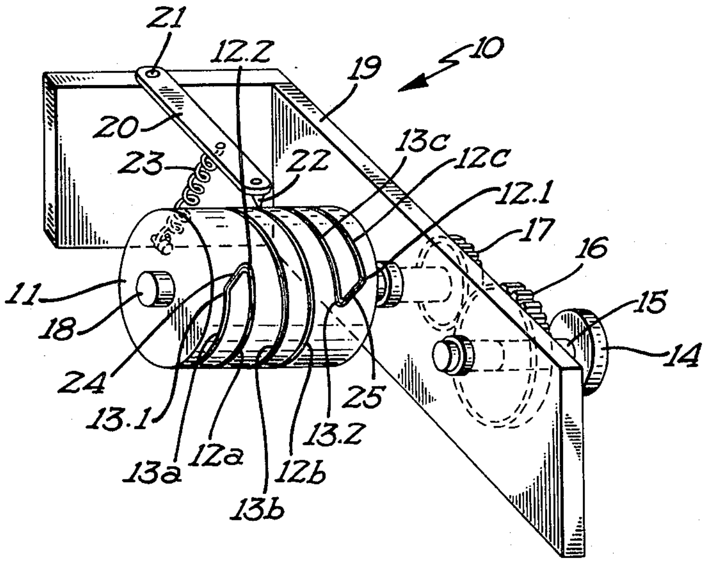
FIG. 1 is a perspective view of the sound reproducing device.

In the drawings, the sound reproducing device is generally designated with 10 and is particularly designed for dolls, but may be used as well in publicity and propaganda means, in money boxes, lighters, automatic vending machines, watches, animal toys, beer pitchers, and other items. The recording body 11 has the form of a drum reciprocatingly journaled and being provided with several independent sound recording grooves **12*a*, 12*b*, 12*c*, 13*a*, 13*b*, 13*c*. These sound recording grooves have a substantially greater depth than the depth of the grooves in ordinary sound records, and the grooves in the recording body 11 may be several tenths of a millimeter in depth. Without excluding other significant depths, the sound recording grooves in the recording body 11 may have depths in the range of two- to nine-tenths of a millimeter. These indicated depths are not intended to be limiting of the invention but only exemplary of the nature of the grooves in the recording body 11**.

The drum 10 is provided to be manually wound up. For this purpose a wheel 14 is provided fastened on shaft 15 and turning the gear 16. The latter engages the gear 17 fastened on the drum shaft 18 and rotating drum 11 when turned. The housing of frame 19 in which the drum shaft 18 is journaled carries further the pickup means 20 which is journaled in the frame 19 and 21.

Figure 2:
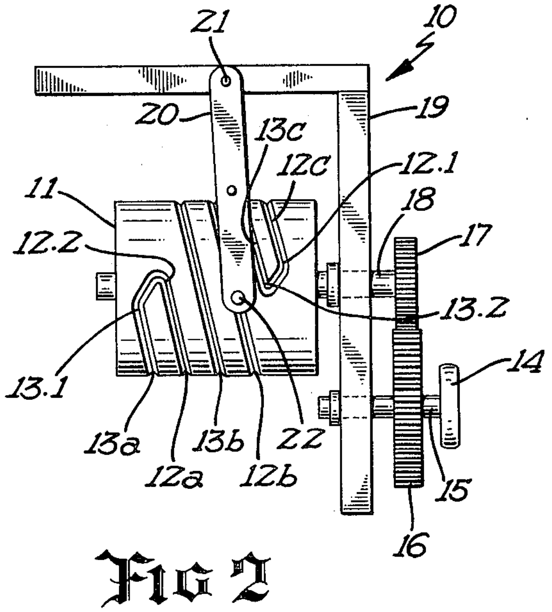
FIG. 2 is a top plan view of the sound reproducing device.
Figure 3:
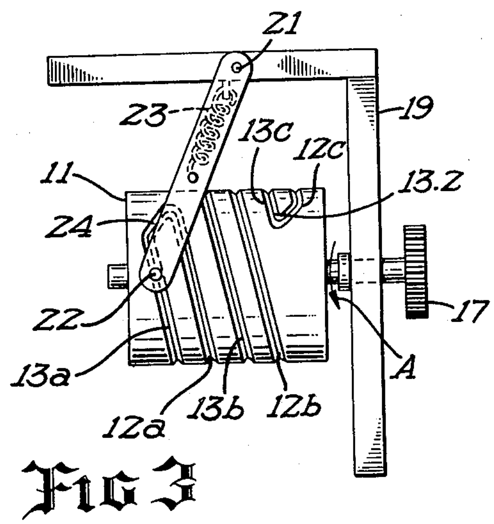
FIGS. 3 to 6 are top plan views of the sound reproducing device, similar to FIG. 2, and illustrating four immediately sequential positions of the stylus in the zone of the left reversal loop.

The pickup arm 20 is biased by a spring 23 which is connected to the arm 20 and to an anchor post 23.1 on the frame 19. The post 23.1 is located opposite the middle of the drum 11, approximately midway between the ends of the drum. The spring 23 resiliently urges the pickup arm inwardly against the grooves of the drum in order to provide a permanent and constant engagement pressure between pickup stylus 22 and sound recording grooves. The spring 23 also biases the pickup arm 20 so as to swing the pickup arm 20 about the pivot 21 so as to move the stylus 22 endwise of the drum and toward a medial position along the length of the drum. Such a medial position is approximately illustrated in FIG. 2 of the drawings. When the stylus is disposed adjacent the left-hand end of the drum, approximately as illustrated in FIG. 3, the spring 23 will tend to swing the pickup arm 20 so as to attempt to return the pickup arm and stylus away from said left-hand end of the drum; and similarly, when the pickup arm and stylus are subsequently moved into proximity with the opposite end of the drum, the spring 23 tends to swing the pickup arm and stylus 22 toward a medial position along the length of the drum as previously described.

Figures 7, 8:
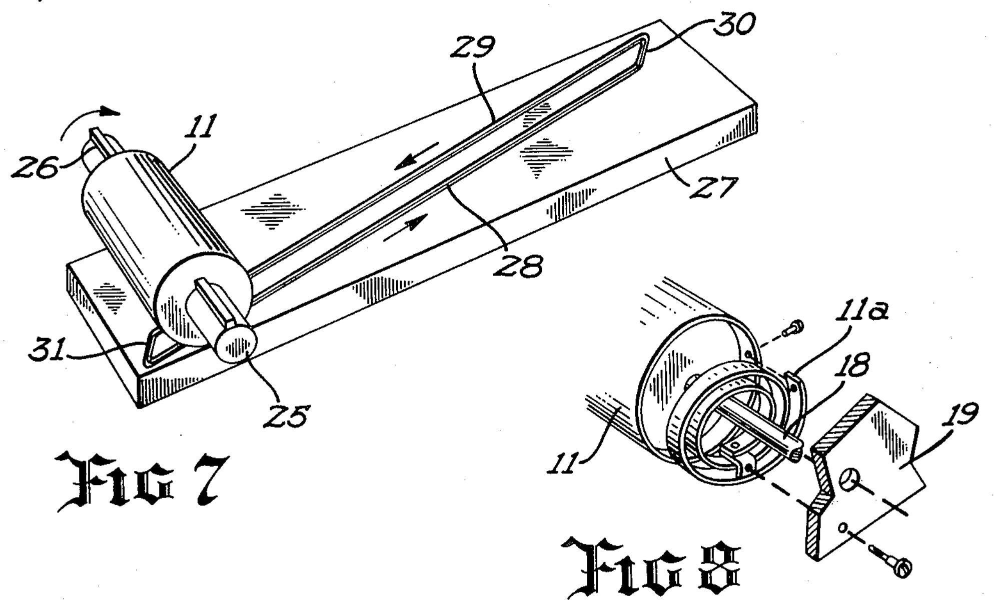
FIG. 7 is a perspective view schematically illustrating a method for manufacturing the sound recording drum.
FIG. 8 is a fragmentary exploded perspective view of one end portion of the drum.

The return of drum 11 for sound reproduction is effected by a spring provided within the hollow drum 11 and shown in FIG. 8 of the drawing. This spring may be similar to the main spring of a watch movement. This spring has one end connected to the drum and has the other end connected to the frame.

The sound recording grooves 12, 13 are of uniform depth and extend over the outer circumference of the drum in helical disposition similar to screw threads, whereby each two adjacent grooves 12 and 13 are oppositely cut respectively, for example, groove 12 is forwardly cut while groove 13 is cut rearwardly. It is, however, possible to provide the cut in the reverse manner. Further, the grooves 12, 13 of opposite cut are connected with each other at the terminating ends adjacent the face of the drum 11 by means of reversal loops 24, 25.

The grooves 12, 13 are cut into the drum circumference like a double or twin screw thread whereby the forwardly cut grooves 12 extend in parallel relation with respect to the rearwardly cut grooves 13. In the shown embodiment the grooves 12, 13 are cut into the drum circumference in accordance with a double turn but this does not limit the invention to this single possibility because in other cases the grooves 12, 13 may be cut in a single turn or on the contrary in five, seven or even more turns.

The reversal loops 24, 25 are designed as grooves connecting, substantially in a straight direction, the terminal end 12.1 of the forwardly cut groove 12 to the start end 13.2 of the rearwardly cut sound recording grooves 13, and the terminal end 13.1 of the rearwardly cut groove 13 to the start end 12.2 of the forwardly cut groove 12. The reversal loops 24, 25 define acute angles with the start ends 12.2 and 13.2 of the grooves and define obtuse angles with the terminal ends 12.1 and 13.1 of the grooves.

It is possible to provide the forwardly cut grooves 12 as empty or idler loops while the rearwardly cut grooves 13 are sound recording means.

Figure 4:
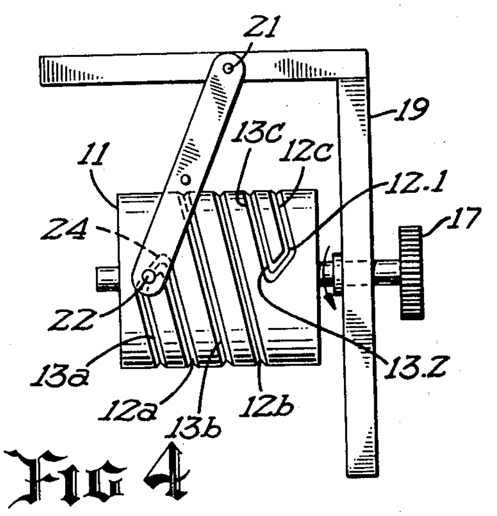

In FIG. 3 the position of the drum 11 is shown in which the pickup stylus 22 is in a position in which it engages the terminal end 13.1 of rearwardly cut groove **13*a* shortly before moving into the reversal loop 24, while in FIG. 4 the pickup stylus 22 engages the reversal loop 24**.

Figure 5:
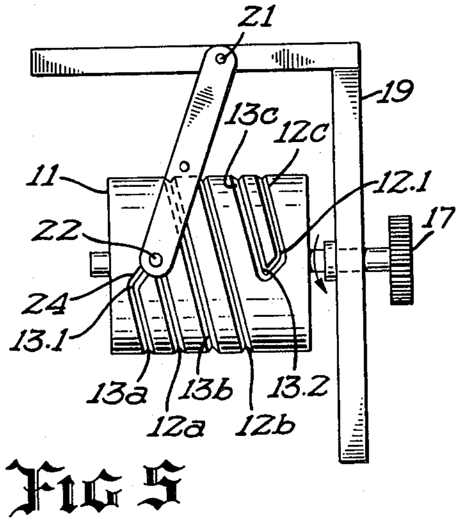
Figure 6:
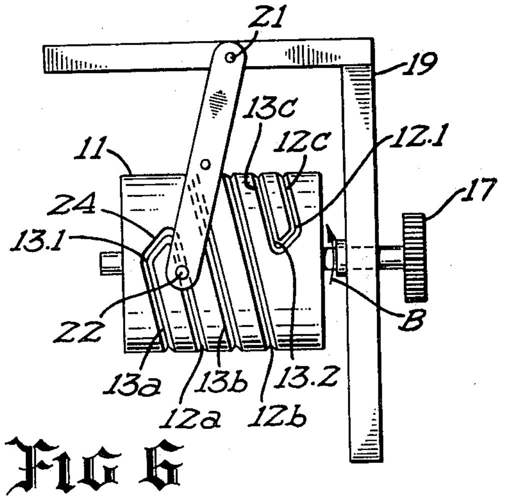

In FIG. 5, the stylus 22 is shown to have reached the acute angle in the groove between the loop 24 and the start end 12.2 of the forwardly cut groove. Because of the substantial depth of the recording groove, and because of the continuous inward pressure exerted by spring 23 through the pickup arm 20 on the stylus 22 bearing inwardly against the drum 11 in the groove, the size of the groove acting upon the stylus will cause the drum 11 to stop rotation until reversal of the drum is caused or permitted. As the stylus 22 moves into this acute angled portion of the groove, the spring 23, which acts to swing the stylus 22 away from the end of the drum and toward a medial position along the length of the drum, will cause the stylus to move sufficiently around the acute angled portion of the groove between the loop 24 and the start end 12.2 of the groove so that when the opposite rotation of the drum occurs, as indicated by arrow B, the stylus will readily follow along the forwardly cut groove **12*a* as indicated in FIG. 6**.

In a similar fashion, when the stylus reaches the terminal end 12.1 of the forwardly cut groove 12, the stylus will pass the obtuse angle in the groove and into the loop 25, and by interaction of the stylus 22 and the acute angled portion of the groove between the loop 25 and the start end 13.2 of the rearwardly cut groove, the drum will again be stopped until rotation of the drum is again permitted or caused in the direction of arrow A as indicated in FIG. 3.

It will be understood that the drum 11 may be provided with a flat circumferential surface on which a tape is fastened with one end and may be wound up on the drum under the action of the spring within the drum. Said tape may be provided with grooves as known per se which act as sound recording means and which are provided at their terminating or starting ends respectively with reversal loops similar to those shown at 24, 25 in the drawings. The winding up operation of the drum may then be effected by simply pulling at the free end of the tape while the other end thereof is fastened to the drum. Thereby it will be possible to have a multiplicity of superposed tape layers on the drum 11. Of course, in such embodiment the gearing means 16, 17 will not be necessary if the free tape end will extend out of the item in which the sound reproducing device is installed.

FIG. 7 shows how the drum 11 may be provided with the grooves including the reversal loops. The drum is carried by a guiding shaft 25 being provided with wedges 26 to eliminate lost motion between shaft 25 and drum 11. The drum will rotatably engage with its circumference a die plate 27 whose surface engaging the drum circumference is provided with protruding ribs 28, 29 interconnected at their end by loops 30, 31. The ribs 28, 29 carry the sound track and the die 27 when rotatably engaging drum 11 and forced against the circumference of the latter will press the sound grooves into the drum thereby as well providing the reversal loops by means of the loops 30, 31.

It will be understood that persons skilled in the art may provide modification of the item as shown which is to be regarded as an example only, the scope of the invention being limited but by the appended claims.

What is claimed is:

1. A sound reproducing device for toys and the like comprising a frame, a cylindrical drum journaled on said frame for rotation relative thereto, manually actuated drive mechanism operatively connected with said drum for rotating the drum in a forward direction, an operating spring connected with said drum and being operable to revolve the drum in a reverse direction to return the drum to its starting position, said drum having a pair of sound grooves of uniform depth in its circumferential surface, a sound producing pickup mechanism comprising a stylus engaging in said grooves and a bias spring connected with said stylus and urging the stylus in constant engagement with the grooves during rotation of the drum to thereby cause reproduction of sound when the drum is revolved, said bias spring also urging the stylus toward a position medial of the drum, one of said sound grooves being a forward groove extending helically from its starting end adjacent one end of the drum toward the other end of the drum to its terminal end, the other of said sound grooves being a return groove extending helically from its starting end adjacent the other end of the drum toward said one end of the drum to its terminal end, the starting end of one sound groove being disposed adjacent the terminal end of the other sound groove, each of the terminal ends of the grooves being disposed adjacent the respective end of the drum and being disposed between the end of the drum and the adjacent starting end of the other groove, a pair of guiding grooves each extending between and coextensively interconnecting the terminal end of one of said sound grooves with the starting end of the other of said sound grooves, each of said guiding grooves being arranged in end-to-end relation with the sound grooves to comprise the only exit and entry relative to the terminal and starting end of the adjoining sound grooves, the starting and terminal ends of each sound groove being connected only to the adjoining guiding grooves to insure stylus travel only between the sound groove and the adjoining guiding grooves, each guiding groove defining with said forward and return sound grooves a closed continuous loop of uniform depth comprised of a pair of rounded included angles, the included angle between the terminal end of one of said sound grooves and the adjoining guiding groove comprising an obtuse angle, and the included angle between the guiding groove and the starting end of the other of said first mentioned grooves comprising an acute angle whereby during rotation of the drum, the stylus is confined and guided directly from the guiding groove through the acute angular change in direction directly to the starting end of one of said sound grooves.

2. The sound reproducing device according to claim 1 wherein said sound producing pickup mechanism includes a pickup arm swingably mounted on said frame and carrying said stylus.

3. The sound reproducing device according to claim 1 wherein said bias spring is anchored on the frame adjacent the drum and between the ends of the drum to urge the stylus endwise of the drum and away from the ends thereof.

4. The sound reproducing device according to claim 1 wherein the stylus and groove cooperate with the bias spring to stop the rotation of the drum after the drum has been returned by the operating spring to its start position.

* * * * *